United States Patent
Khorrami et al.

(10) Patent No.: US 11,542,399 B2
(45) Date of Patent: Jan. 3, 2023

(54) COATING COMPOSITION

(71) Applicant: HEWLETT-PACKARD DEVELOPMENT COMPANY, L.P., Spring, TX (US)

(72) Inventors: Fereshteh Khorrami, San Diego, CA (US); Xulong Fu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 333 days.

(21) Appl. No.: 16/605,100

(22) PCT Filed: Jul. 12, 2017

(86) PCT No.: PCT/US2017/041752
§ 371 (c)(1),
(2) Date: Oct. 14, 2019

(87) PCT Pub. No.: WO2019/013784
PCT Pub. Date: Jan. 17, 2019

(65) Prior Publication Data
US 2021/0122933 A1  Apr. 29, 2021

(51) Int. Cl.
*C09D 7/61* (2018.01)
*C09D 109/10* (2006.01)
(Continued)

(52) U.S. Cl.
CPC .............. *C09D 7/61* (2018.01); *B41M 5/5218* (2013.01); *C09D 1/00* (2013.01); *C09D 109/10* (2013.01)

(58) Field of Classification Search
CPC ...... B41M 5/506; B41M 5/52; B41M 5/5218; B41M 5/5227; B41M 5/5254;
(Continued)

(56) References Cited

U.S. PATENT DOCUMENTS 6,004,389 A  12/1999 Yatake
6,140,406 A  10/2000 Schliesman et al.
(Continued)

FOREIGN PATENT DOCUMENTS

EP  1245730  10/2002
EP  1524279  4/2005
(Continued)

OTHER PUBLICATIONS

Lundberg, A., "Ink-Paper Interactions and Effect on Print Quality in Inkjet Printing", Dept. of Info., Tech, and Media. Mid Sweden University, ISSN 1652-8948, 2011, 38 pages.

*Primary Examiner* — Shuangyi Abu Ali
(74) *Attorney, Agent, or Firm* — Dierker & Kavanaugh PC

(57) ABSTRACT

An example of a coating composition includes an inorganic pigment, a latex, a cationic fixing agent, and a stabilizer selected from the group consisting of ethopropoxylated polyarylphenol, ethoxylated tristyrylphenol, modified fatty alcohol polyglycol ethers, and combinations thereof. Another example of a coating composition consists essentially of an inorganic pigment, a latex, a cationic fixing agent, a stabilizer selected from the group consisting of ethopropoxylated polyarylphenol, ethoxylated tristyrylphenol, modified fatty alcohol polyglycol ethers, and combinations thereof, and water.

12 Claims, 1 Drawing Sheet

(51) Int. Cl.
*C09D 1/00* (2006.01)
*B41M 5/52* (2006.01)

(58) Field of Classification Search
CPC ........ C09D 109/10; C09D 1/00; C09D 5/027;
C09D 7/45; C09D 7/61; D21H 19/36;
D21H 19/44; D21H 19/46; D21H 21/14
See application file for complete search history.

(56) References Cited

U.S. PATENT DOCUMENTS

| | | |
|---|---|---|
| 6,203,899 B1 | 3/2001 | Hirose |
| 8,814,335 B2 | 8/2014 | Inumaru et al. |
| 9,278,515 B2 | 3/2016 | Sarkisian et al. |
| 2007/0272382 A1* | 11/2007 | Becker ................... D21H 19/44 |
| | | 162/136 |
| 2013/0053469 A1* | 2/2013 | Kappaun .............. C09D 11/101 |
| | | 522/167 |
| 2014/0055520 A1 | 2/2014 | Inumaru et al. |
| 2014/0212591 A1 | 7/2014 | Swei et al. |

FOREIGN PATENT DOCUMENTS

| | | | |
|---|---|---|---|
| WO | WO-2011014199 | 2/2011 | |
| WO | WO-2016130158 A1 * | 8/2016 | .............. B41M 5/52 |
| WO | WO-2018022020 | 2/2018 | |
| WO | WO-2018080484 | 5/2018 | |
| WO | WO-2018080485 | 5/2018 | |

* cited by examiner

COATING COMPOSITION

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
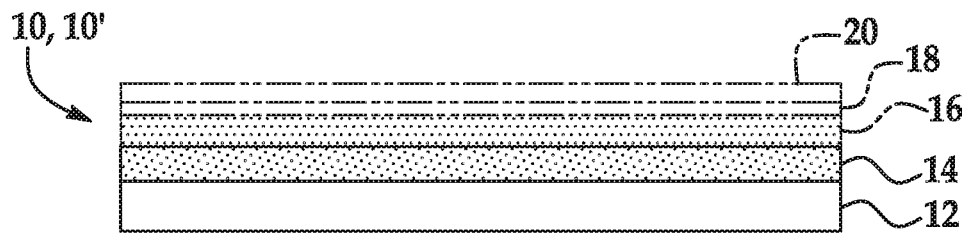
FIG. 1 is a cross-sectional view of an example of a printable recording medium disclosed herein, also showing (in phantom) an example of a printed article.

Fixer fluid or primer fluid containing cationic fixing agent(s), such as salts or organic acids, has been successfully used in different types of applications with uncoated and coated media designed for inkjet printing. In these applications, the cationic fixer fluid is applied at the surface of the uncoated or coated media (often just before printing). The salts or organic acids in the cationic fixer fluid react with anionic components in the subsequently applied pigmented inkjet ink to fix the pigments at the surface of the uncoated or coated media. Fixing the pigments in this manner may enhance the performance attributes (e.g., reduces bleed and thus improves print quality).

In the examples disclosed herein, a cationic fixing agent is included in a coating composition, which is incorporated onto a base substrate of the medium, at the papermaking stage, rather than as part of an additional fixer fluid or primer fluid applied to the already formed medium. As such, the examples of the printable recording medium disclosed herein can be printed on without undergoing a pre-printing priming process. Moreover, it has been found that the addition of particular compounds (referred to herein as the stabilizer) into the coating composition instead of a dispersant stabilizes the other coating components (e.g., latex, pigment, etc.) in the cationic environment. The stabilization of the coating composition components helps to maintain a desirable viscosity (e.g., 300 cp to about 3,500 cp measured at 25° C. and 100 rpm with a Brookfield viscometer) for coat ability. Moreover, a wide variety of latexes and/or pigments may be stabilized by the highly polar compounds, and thus the coating composition component choices may be relatively broad. The coating composition disclosed herein also enhances the durability of the printable recording medium during a printing process and/or during a corrugation process, while maintaining performance attributes (e.g., reduces bleed and/or text feathering and/or pigment floatation, and thus improves print quality).

In some examples, the coating composition comprises an inorganic pigment; a latex; a cationic fixing agent; and a stabilizer selected from the group consisting of ethopropoxylated polyarylphenol, ethoxylated tristyrylphenol, modified fatty alcohol polyglycol ethers, and combinations thereof. In these examples, the coating composition may include additional components. Examples of additional components that may be included in the coating composition include polyvinyl alcohol, a plastic pigment, water, or a combination thereof. In an example, the coating composition further comprises polyvinyl alcohol, a plastic pigment, water, or a combination thereof.

In other examples, the coating composition consists of the inorganic pigment, the latex; the cationic fixing agent; the stabilizer; and water with no other components. In still other examples, the coating composition consists essentially of: an inorganic pigment; a latex; a cationic fixing agent; a stabilizer selected from the group consisting of ethopropoxylated polyarylphenol, ethoxylated tristyrylphenol, modified fatty alcohol polyglycol ethers, and combinations thereof; and water. When the coating composition consists essentially of the inorganic pigment, the latex, the cationic fixing agent, the stabilizer, and water, the coating composition may include other components that do not materially alter or affect the formulation and/or function of the coating composition.

As mentioned above, the coating composition includes the stabilizer, which aids in stabilization of the other components of the coating composition (e.g., the inorganic pigment and/or latex) in the presence of the cationic fixing agent. The addition of the stabilizer to the coating composition allows the coating composition to maintain a runnable or coatable viscosity even after a storage period (e.g., one (1) week or longer). The viscosity may increase slightly when stored for over one week, in part because some evaporation may occur. In an example, after one week of storage, the coating composition may have a runnable or coatable viscosity of 2,000 cp or less (when measured with a Brookfield Viscometer at 25° C. and 100 rpm). In another example, the runnable or coatable viscosity ranges from about 300 cp to about 3,500 cp when measured with the same instrument and conditions. In still another example, the runnable or coatable viscosity ranges from about 800 cp to 1,500 cp when measured with the same instrument and conditions. In yet another example, the runnable or coatable viscosity is 1,500 cp or less when measured with the same instrument and conditions. In yet another example, the runnable or coatable viscosity is 1,300 cp or less when measured with the same instrument and conditions.

In an example, the stabilizer is present in an amount ranging from about 0.01 dry wt % to about 2 dry wt % based on the total dry weight of the coating composition. In another example, the stabilizer is present in an amount ranging from about 0.1 dry wt % to about 2 dry wt % based on the total dry weight of the coating composition. In another example, the stabilizer is present in an amount ranging from about 0.1 dry wt % to about 0.5 dry wt % based on the total dry weight of the coating composition. As used herein, a dry wt % based on the total dry weight of the coating composition refers to that component's percentage (by weight) of all the components of the coating composition prior to the addition of water or after water is removed therefrom. In other words, the dry wt % of any component is the dry parts of that component divided by the total dry parts of all the coating composition dry components multiplied by 100.

Examples of the stabilizer include ethopropoxylated polyarylphenol, ethoxylated tristyrylphenol, modified fatty alcohol polyglycol ethers, and combinations thereof. An example of ethopropoxylated polyarylphenol is commercially available as SOPROPHOR® 796/p from Solvay. An example of ethoxylated tristyrylphenol is commercially available as SOPROPHOR® S/25 from Solvay. Examples of modified fatty alcohol polyglycol ethers are commercially available as DEHYPON® E, GRA, KE, or WET or PLURAFAC® LF 7319 (all from BASF Corp.).

The coating composition also includes the cationic fixing agent. In an example, the cationic fixing agent is selected from the group consisting of water-soluble mono-valent metallic salts and water-soluble multi-valent metallic salts, wherein the metallic salt includes (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, chlorohydrate, and combinations thereof. Some examples of the cation include sodium, calcium, copper, nickel, magnesium, zinc, barium, iron, aluminum, and chromium, and combinations thereof. Some examples of the cationic fixing agent include calcium chloride, magnesium chloride, calcium bromide, magnesium bromide, calcium nitrate, magnesium nitrate, aluminum chlorohydrate, and combinations thereof. In an example, the cationic fixing agent is calcium chloride ($CaCl_2$).

The cationic fixing agent may be present in the coating composition in an amount ranging from about 3 dry wt % to about 10 dry wt % based on the total dry weight of the coating composition.

As mentioned above, a reaction may take place between the cationic fixing agent and an anionic pigment in the ink (applied to the printable recording medium) to fix the anionic pigment. The cationic fixing agent fixes a printed image in an ink-receiving layer of the printable recording medium, where the coating composition is used to form the ink-receiving layer. As such, image quality (e.g., bleed, coalescence, text quality, etc.) is controlled by the cationic fixing agent of the printable recording medium (not by a fixer fluid or primer fluid applied to an already formed medium).

Examples of the coating composition disclosed herein also include an inorganic pigment. The type and/or amount of the inorganic pigment of the coating composition may be selected to obtain desirable penetration for the ink ingredients and/or to obtain desirable durability levels (e.g., measured using various techniques, such as Sutherland Dry Rub) of the resulting printed image.

Examples of the inorganic pigment include calcined clay, modified calcium carbonate (MCC), fine and/or ultra-fine ground calcium carbonate (GCC), precipitated calcium carbonate (PCC), and combinations thereof. In an example, the inorganic pigment is selected from the group consisting of calcined clay, modified calcium carbonate (MCC), ultra-fine ground calcium carbonate (GCC), precipitated calcium carbonate (PCC), and combinations thereof. In another example, the inorganic pigment is selected from the group consisting of calcined clay, modified calcium carbonate (MCC), ultra-fine ground calcium carbonate (GCC), and combinations thereof.

An example of calcined clay is commercially available as KAOCAL® from Thiele Kaolin Company (Sandersville, Ga.) and has a particle size distribution of about 83-92% particles finer than 2 µm. Some examples of ground calcium carbonate include HYDROCARB® 60 (a fine ground calcium carbonate having a solids content of about 74% and a median diameter of about 1.4 µm) and HYDROCARB® 90 (an ultrafine ground calcium carbonate having a solids content of about 76% and a median diameter of about 0.7 µm), both available from Omya North America (Cincinnati, Ohio).

In some examples, the inorganic pigment is calcined clay; or a mixture of calcined clay and fine ground calcium carbonate; or a mixture of calcined clay and ultrafine ground calcium carbonate; or a mixture of calcined clay and fine ground and ultrafine ground calcium carbonate. In an example, the mixture contains, by dry weight, at least about 50% of fine and/or ultrafine ground calcium carbonate.

In some examples, the inorganic pigment of the coating composition is an ultrafine ground calcium carbonate (having a median particle size of about 0.7 µm), calcined clay (having a particle size distribution of about 83-92% particles finer than 2 µm), and/or a combination thereof.

The particle size of the inorganic pigment may affect the gloss levels of the resulting printed image. A smaller particle size of the inorganic pigment may result in a higher gloss level in the resulting print. As used herein, the term "particle size", refers to the diameter of a substantially spherical particle (i.e., a spherical or near-spherical particle having a sphericity of >0.84), or the average diameter of a non-spherical particle (i.e., the average of multiple diameters across the particle). The inorganic pigment may have a median particle size ranging from about 0.5 µm to about 5 µm. In another example, the inorganic pigment has a median particle size ranging from about 0.5 µm to about 2 µm. In still other examples, the inorganic pigment has a median particle size ranging from about 0.75 µm to about 2 µm, or has a median particle size ranging from about 0.5 µm to about 1 µm.

In an example, the inorganic pigment may be present in the coating composition in an amount ranging from about 70 dry wt % to about 90 dry wt % based on the total dry weight of the coating composition.

Examples of the coating composition include a latex. As used herein, the term "latex" refers to a polymer that is capable of being dispersed in an aqueous medium. The latex may act as a binder in the coating composition. In an example, the latex is present in the coating composition in an amount ranging from about 5 dry wt % to about 20 dry wt % based on the total dry weight of the coating composition. In another example, the latex is present in the coating composition in an amount ranging from about 5 dry wt % to about 10 dry wt % based on the total dry weight of the coating composition.

In an example, the latex is formed from a monomer selected from the group consisting of vinyl monomers, allylic monomers, olefin monomers, unsaturated hydrocarbon monomers, and combinations thereof.

Classes of vinyl monomers include vinyl aromatic monomers (e.g., styrene), vinyl aliphatic monomers (e.g., butadiene), vinyl alcohols, vinyl halides, vinyl esters of carboxylic acids (e.g., vinyl acetate), vinyl ethers, (meth)acrylic acid, (meth)acrylates, (meth)acrylamides, (meth)acrylonitriles, and mixtures of two or more of the above, for example. The term "(meth) acrylic latex" includes polymers of acrylic monomers, polymers of methacrylic monomers, and copolymers of the aforementioned monomers with other monomers.

Examples of vinyl aromatic monomers that may form the latex include styrene, 3-methylstyrene, 4-methylstyrene, styrene-butadiene, p-chloro-methylstyrene, 2-chlorostyrene, 3-chlorostyrene, 4-chlorostyrene, divinyl benzene, vinyl naphthalene and divinyl naphthalene. Vinyl halides that may be used include, for example, vinyl chloride and vinylidene fluoride. Vinyl esters of carboxylic acids that may be used include, for example, vinyl acetate, vinyl butyrate, vinyl methacrylate, vinyl 3,4-dimethoxybenzoate, vinyl maleate and vinyl benzoate. Examples of vinyl ethers that may be employed include butyl vinyl ether and propyl vinyl ether.

In some examples, the latex may be a styrene/butadiene latex copolymer. In some other examples, the latex may be a styrene/butadiene/acrylonitrile latex copolymer. Some examples of the latex polymer/copolymer include aqueous, anionic carboxylated styrene/butadiene copolymer dispersions commercially available under the tradenames LITEX® PX 9710, LITEX® 9720, LITEX® 9730 and LITEX® PX 9740, from Synthomer (Essex, UK), styrene/butadiene/acrylonitrile copolymers commercially available under the tradenames GENCRYL® 9525, GENCRYL® 9750, and GENCRYL® 9780, from Omnova, a styrene/butadiene copolymer commercially available under the tradename STR 5401, from Dow Chemical Company (Midland, Mich.), and/or combination(s) thereof.

In some examples, the coating composition further includes polyvinyl alcohol. The polyvinyl alcohol may act as an additional binder. In an example, the polyvinyl alcohol may be present in the coating composition in an amount ranging from greater than 0 dry wt % to about 8 dry wt % based on the total dry weight of the coating composition. Examples of polyvinyl alcohol are commercially available under the tradenames MOWIOL® 4-98 and MOWIOL®6-98, from Kuraray America, Inc. (Houston, Tex.).

In some examples, the coating composition further includes a plastic pigment. The plastic pigment, if included, may serve to enhance paper gloss. In an example, the plastic pigment may be present in the coating composition in an amount ranging from greater than 0 dry wt % to about 10 dry wt % (based on the total dry weight of the coating composition).

Examples of the plastic pigment may include styrene based pigments and/or hollow sphere type polystyrene based pigments. In some examples, the plastic pigment has a glass transition temperature ($T_g$) equal to or greater than 85° C. In some other examples, the plastic pigment has a $T_g$ equal to or greater than 100° C. One example of the plastic pigment includes ROPAQUE™ AF1055 from Dow Chemical. ROPAQUE™ AF1055 is a hollow sphere styrene acrylic polymeric pigment with a 1.0 µm particle size and a 55% void volume. Another example of the plastic pigment is LYTRON™ HG80 from Omnova Solutions Inc. LYTRON™ HG80 is a hollow sphere pigment with a 1 µm unimodal particle size distribution.

In some examples, the coating composition may also include an additive. The additive may be a rheology modifier, a surfactant, a dye, an optical brightening agent, a dispersing agent, a crosslinker, or a combination thereof. In an example, the additive is present in the coating composition in an amount ranging from about 0.1 dry wt % to about 2 dry wt % (based on the total dry weight of the coating composition). In another example, the additive is present in the coating composition in an amount ranging from about 0.2 dry wt % to about 1 dry wt %.

In an example, the coating composition is devoid of dispersants and surfactants. The coating composition may be devoid of dispersants and surfactants because the stabilizer sufficiently stabilizes the coating composition without the aid of other dispersants and/or surfactants.

In an example, the coating composition is devoid of waxes. The coating composition may be devoid of waxes when an overprint varnish is used.

In some examples of the coating composition, the inorganic pigment is present in an amount ranging from about 70 dry wt % to about 90 dry wt % based on a total dry weight of the coating composition; the latex is present in an amount ranging from about 5 dry wt % to about 20 dry wt % based on the total dry weight of the coating composition; the cationic fixing agent is present in an amount ranging from about 3 dry wt % to about 10 dry wt % based on the total dry weight of the coating composition; and the stabilizer is present in an amount ranging from about 0.01 dry wt % to about 2 dry wt % based on the total dry weight of the coating composition.

The coating composition also includes water. In an example, deionized water may be used. Water may be present in an amount sufficient to achieve the desired total solids content of the coating composition. In an example, the coating composition has a solids content ranging from about 50 wt % to about 70 wt %, based on the total weight of the coating composition. In another example, the coating composition has a solids content ranging from about 50 wt % to about 60 wt %, based on the total weight of the coating composition.

In an example, the coating composition has a viscosity of 2,000 cp or less when measured at room temperature (e.g., a temperature ranging from about 18° C. to about 25° C.) and 100 rpm using a Brookfield Viscometer. In another example, the coating composition has a viscosity ranging from about 300 cp to about 3,500 cp when measured at these conditions. In still another example, the coating composition has a viscosity ranging from about 800 cp to 1,500 cp when measured at these conditions. In yet another example, the coating composition has a viscosity of 1,500 cp or less when measured at these conditions. In yet another example, the coating composition has a viscosity of 1,300 cp or less when measured at these conditions. In some examples, the coating composition may maintain any of the above viscosities (measured with a Brookfield Viscometer) even after being stored for about one week. As such, the coating composition may have a runnable coat viscosity and be able to be coated on a base substrate during the manufacturing of the printable recording medium.

The coating composition may be used to form an ink-receiving layer of a printable recording medium. An example of the printable recording medium 10 is shown in FIG. 1.

The printable recording medium 10 comprises a base substrate 12; and a first ink-receiving layer 14, including: an inorganic pigment; a latex; a cationic fixing agent; and a stabilizer selected from the group consisting of ethopropoxylated polyarylphenol, ethoxylated tristyrylphenol, modified fatty alcohol polyglycol ethers, and combinations thereof. In some examples, the printable recording medium 10 consists of these layers, with no other layers. In other examples, the printable recording medium 10 may include additional layer(s), such as a second ink-receiving layer 16.

A printed article 10' includes an ink layer 18 (shown in phantom in FIG. 1) fixed on and/or in the ink-receiving layer(s) 14, 16 of the printable recording medium 10. An over-print varnish layer 20 may also be included (if desired) on the ink layer 18 on the printed article 10'.

The base substrate 12 of the printable recording medium 10 acts as a support layer. The base substrate 12 provides structural integrity for the resultant printable recording medium 10. In some examples, the base substrate 12 serves as the bottom of the printable recording medium 10. In other examples, the back side of the base substrate 12 may be coated with a layer (e.g., a curl control layer or an ink-receiving layer). The material of the base substrate 12 should have good affinity and good compatibility for the ink that is to be applied to the printable recording medium 10. As such, the base substrate 12 should have the ability to absorb the ink vehicle of the liquid ink (i.e., move the water and/or co-solvent of the ink vehicle away from the first ink-receiving layer 14).

The base substrate 12 contains a material that serves as a base upon which the coating composition can be applied to form the ink-receiving layer 14.

The base substrate 12 can be either bleached or non-bleached. In some examples, the base substrate 12 can be two ply sheets where the top ply is made of bleached fiber, and the bottom ply is made of unbleached fiber. In another example, the base substrate 12 is made of one single ply of bleached fiber. Kraft pulp from pines or other conifers are suitable fibers for liner paper (i.e., liner). In still another example, recycled fibers are used to make the liner paper which is called Testliner. In yet another example, to improve printability, a minor portion of hardwood fiber may be added to the base substrate 12. Any suitable fibers for making paper, cardboard, paperboard, liner paper, or another suitable paper product may be used for the base substrate 12. In an example, the base substrate 12 includes hardwood fibers, softwood fibers, recycled fibers, or combinations thereof.

The basis weight of the base substrate 12 may be dependent on the nature of the application of the printable recording medium 10, where lighter weights are employed for magazines and tri-folds, and heavier weights are employed for postcards, for example. In some examples, the base substrate 12 has a basis weight of about 60 grams per square meter ($g/m^2$ or gsm) to about 400 gsm, or about 100 gsm to about 250 gsm.

In an example, the base substrate 12 may have a thickness along substantially the entire length ranging between about 0.025 mm and about 0.5 mm.

In an example, the coating composition is coated on the base substrate 12 during the manufacturing of the base substrate 12 to initiate the formation of the ink-receiving layer 14. In an example, the coating composition may be applied or coated on a pulp of the base substrate material when the pulp includes at least 90% solids and less than 100% solids (by weight). Examples of suitable coating techniques include slot die coating, roller coating, fountain curtain coating, blade coating, rod coating, air knife coating, gravure applications, and air brush applications.

After being coated, the coating composition on the pulp of the base substrate material may be dried to at least substantially remove liquid from the pulp to form the base substrate 12 and from the coating composition to form the ink-receiving layer 14. In an example, the coating composition may be dried until the printable recording medium 10 has a predetermined moisture content. For example, the coating composition may be dried until the printable recording medium 10 has a moisture content ranging from about 1 wt % to about 10 wt %, or until the printable recording medium 10 has a moisture content ranging from about 2 wt % to about 5 wt % (based on the total weight of the printable recording medium 10).

As shown in FIG. 1, the first ink-receiving layer 14 of the printable recording medium 10 is formed on one side of the base substrate 12 (e.g., directly on top of the base substrate 12). It is to be understood that, as used herein, the terms "formed on", "disposed on", "deposited on", "established on", and the like are broadly defined to encompass a variety of divergent layering arrangements and assembly techniques. These arrangements and techniques include i) the direct attachment of a layer (e.g., the first ink-receiving layer 14) to another layer (e.g., the base substrate 12) with no intervening layers therebetween and ii) the attachment of a layer (e.g., the first ink-receiving layer 14) to another layer (e.g., base substrate 12) with one or more layers therebetween, provided that the one layer being "formed on", "disposed on", "deposited on", or "established on" the other layer is somehow supported by the other layer (notwithstanding the presence of one or more additional material layers therebetween).

Further, the phrases "formed directly on", "disposed directly on", "deposited directly on", "established directly on" and/or the like are broadly defined herein to encompass a situation(s) wherein a given layer (e.g., first ink-receiving layer 14) is secured to another layer (e.g., base substrate 12) without any intervening layers therebetween.

Any statement used herein which indicates that one layer is on another layer is to be understood as involving a situation wherein the particular layer that is "on" the other layer in question is the outermost of the two layers relative to incoming ink materials being delivered by the printing system of interest. It is to be understood that the characterizations recited above are to be effective regardless of the orientation of the recording medium materials under consideration.

The first ink-receiving layer 14 is formed from the coating composition. As such, the components of the coating composition (except for water, which is substantially removed during drying (e.g., the moisture content of the printable recording medium 10 may range from about 1 wt % to about 10 wt %, or from about 2 wt % to about 5 wt % based on the total weight of the printable recording medium 10) are present in the first ink-receiving layer 14 in amounts (in wt %) about equal to, or equal to the amounts (in dry wt %) in the coating composition. In an example, the stabilizer is present in an amount ranging from about 0.01 wt % to about 2 wt % based on the total weight of the first ink-receiving layer 14. In another example, the cationic fixing agent is present in an amount ranging from about 3 wt % to about 10 wt % based on a total weight of the first ink-receiving layer 14.

The first ink-receiving layer 14 may provide a good absorption rate of water, solvent and/or ink vehicle. During absorption, the pigment in the ink composition applied to the printable recording medium 10 immediately interacts with the fixing agent in the first ink-receiving layer 14 so that image quality issues, such as bleed and/or coalescence issues, are avoided at high printing speeds (e.g., a high printing speed ranging from about 100 feet per minute (fpm) to about 600 fpm). The ink-receiving layer 14 may also provide good durability and enhance sheet gloss.

In an example, the first ink-receiving layer 14 may have a coating weight ranging from about 5 gsm to about 30 gsm. In another example, the first ink-receiving layer 14 may have a coating weight ranging from about 10 gsm to about 20 gsm.

After drying, the printable recording medium 10 may further be calendered (either in-line calendered (hard or soft nip), or offline supercalendered) at a suitable speed, temperature, pressure and number of nips to reach a desired thickness (caliper), and/or a desired smoothness, and/or a desired gloss level.

Depending upon the base substrate 12, the resulting printable recording medium 10 may be a coated paper, a coated cardboard, a coated paperboard, a coated liner, or other like coated media. As an example, the resulting printable recording medium 10 may be a coated glossy medium that can be printed on at speeds utilized in commercial and other printers such as, for example, an HP Inkjet Web Press (HP Inc., Palo Alto, Calif., USA). One example of a web press is the HP PageWide T400S Press.

In some examples, the printable recording medium 10 further comprises a second ink-receiving layer 16 disposed on the first ink-receiving layer 14, the second ink-receiving layer 16 including: a second inorganic pigment; a second latex; a second cationic fixing agent; and a second stabilizer selected from the group consisting of ethopropoxylated polyarylphenol, ethoxylated tristyrylphenol, modified fatty alcohol polyglycol ethers, and combinations thereof. In some other examples, the printable recording medium 10 further comprises a second ink-receiving layer 16 disposed on the first ink-receiving layer 14, the second ink-receiving layer 16 including: a second inorganic pigment; a second latex; and a second stabilizer selected from the group consisting of ethopropoxylated polyarylphenol, ethoxylated tristyrylphenol, modified fatty alcohol polyglycol ethers, and combinations thereof.

The second ink-receiving layer 16 may provide the printable recording medium 10 with good durability by protecting and minimizing damage to the printed image (printed article 10'). The second ink-receiving layer 16 may also provide a high gloss to the printable recording medium 10.

In some examples, the second ink-receiving layer 16 may be formed from the coating composition. In these examples, the second ink-receiving layer 16 contains the same components in the amounts as the first ink-receiving layer 14. In other examples, the second ink-receiving layer 16 may be formed from a second coating composition. In these examples, the second ink-receiving layer 16 components may be the same as, similar to, or different than the components in the first ink-receiving layer 14, and will depend upon the formulation of the second coating composition.

When the second coating composition is used to form the second ink-receiving layer 16, the second coating composition may include any of the previously listed inorganic pigments (as the second inorganic pigment), latexes (as the second latex), cationic fixing agents (as the second cationic fixing agent), and/or stabilizers (as the second stabilizer) in the previously described amounts (except that the dry wt % is based on the total dry weight of the second coating composition). The second coating composition may also include any of the previously listed components, such as polyvinyl alcohol, plastic pigments, or additive(s) in the previously described amounts (except that the dry wt % is based on the total dry weight of the second coating composition). In an example, the second coating composition may be devoid of dispersants and surfactants (other than the stabilizer disclosed herein). In another example, the second coating composition may be devoid of waxes. The second coating composition includes water (e.g., deionized water). Water may be present in the second coating composition an amount sufficient to achieve the desired total solids content of the second coating composition (e.g., a solids content ranging from about 50 wt % to about 70 wt %, based on the total weight of the second coating composition).

In an example, the second coating composition has a viscosity of 2,000 cp or less when measured at room temperature (e.g., a temperature ranging from about 18° C. to about 25° C.) and 100 rpm using a Brookfield Viscometer. In other examples, the second coating composition has a viscosity ranging from about 300 cp to about 3,500 cp when measured at these conditions; or a viscosity ranging from about 800 cp to 1,500 cp when measured at these conditions; or a viscosity of 1,500 cp or less when measured at these conditions; or a viscosity of 1,300 cp or less when measured at these conditions. In some examples, the second coating composition may maintain any of the above viscosities after a storage period. As such, the second coating composition may have a runnable coat viscosity and be able to be coated on the first ink-receiving layer 14.

The second ink-receiving layer 16 (when present) is formed from the coating composition or the second coating composition. As such, the components (except for water, which is substantially removed during drying (e.g., the moisture content of the printable recording medium 10 may range from about 1 wt % to about 10 wt %, or from about 2 wt % to about 5 wt % based on the total weight of the printable recording medium 10)) of the coating composition or the second coating composition are present in the second ink-receiving layer 16 in amounts (in wt %) about equal to, or equal to the amounts (in dry wt %) in the coating composition or the second coating composition.

In an example, the second ink-receiving layer 16 may have a coating weight ranging from about 5 gsm to about 15 gsm. In another example, the second ink-receiving layer 16 may have a coating weight that is no more than about 50% of the coating weight of the first ink-receiving layer 14.

The coating composition or the second coating composition may be applied/coated on the dried, first ink-receiving layer 14 to form the second ink-receiving layer 16. Any of the coating techniques listed above may be used to apply/coat the coating composition or the second coating composition. It is to be understood that when the second ink-receiving layer 16 is formed from the coating composition or the second coating composition, the water is substantially removed during the formation/drying of the second ink-receiving layer 16.

In an example of the printable recording medium 10, the first ink-receiving layer 14 is disposed on top of the base substrate 12, and the second ink-receiving layer 16 is disposed on top of the first ink-receiving layer 14. In another example of the printable recording medium 10, the first ink-receiving layer 14 is disposed directly on top of the base substrate 12, and the second ink-receiving layer 16 is disposed directly on top of the first ink-receiving layer 14.

In an example, ink-receiving layer(s) (not shown) in addition to the first ink-receiving layer 14 and the second ink-receiving layer 16 may be included in the printable recording medium 10. As many additional ink-receiving layer(s) as it takes to achieve a desired total coat weight of all the ink-receiving layers (e.g., a coat weight of about 30 gsm) may be included in the printable recording medium 10. The additional ink-receiving layer(s) may be disposed on the base substrate 12, the first ink-receiving layer 14, or the second ink-receiving layer 16. Each of the ink-receiving layers may be considered sub-layers of one ink-receiving layer 14 having the desirable coat weight.

In some examples, the printable recording medium 10 may be a printable package liner. In these examples, the base substrate 12 may be liner paper and/or paperboard. The first ink-receiving layer 14, and the second ink-receiving layer 16 (when present) may be applied to the base substrate 12 (during manufacturing thereof) as described above.

This example of the printable recording medium 10 may be used to form corrugated paper board. Corrugated paper board is a material that includes a fluted corrugated sheet and one or two flat printable package liners (also known as linerboards). Corrugated paper board is made on flute lamination machines or corrugators and is used in the manufacture of shipping containers and corrugated boxes. The corrugated medium and the base substrate 12 of the printable package liners may both be made of kraft containerboard, a paper board material that is usually over 0.01 inches (0.25 mm) thick. In this example, the exposed surface(s) of the printable package liner(s) is/are printed on (i.e., has an image, text, or the like printed thereon). As such, the ink layer 18 and the over-print varnish layer 20 (when present) may be disposed on the printable package liner example of the printable recording medium 10 to form the printed article 10'.

Corrugated boxes may include the corrugated paper board, and may be used as shipping containers. These containers may require printing and labels to identify the contents, to provide legal and regulatory information, and to provide bar codes for routing. Boxes that are used for marketing, merchandising and point-of-sale often have high graphics to help communicate the contents. When used as the printable package liner for corrugated boxes, the printable recording medium 10 disclosed herein provides the boxes with a printable surface.

As mentioned herein, the first ink-receiving layer 14, alone or in combination with the second ink-receiving layer 16 is/are applied to one side of the base substrate 12. As shown in FIG. 1, in some examples, the printable recording medium 10 has no layer applied to the other side of the base substrate 12 (i.e., a side of the base substrate 12 opposed to the one side). In other examples (not shown), a curl control layer (not shown) may be applied to the side of the base substrate 12 opposed to the one side having the ink-receiving layer(s) 14 or 14 and 16 thereon. The curl control layer may be used to balance the curl of the final product or to improve sheet feeding through printing, overcoat and hot corrugation processes. In an example, the curl control layer includes starch.

In still other examples (not shown), the first ink-receiving layer 14 and/or the second ink-receiving layer 16 is/are applied to both sides of the base substrate 12. In some of these examples, the first ink-receiving layer 14 and/or the second ink-receiving layer 16 may applied to both sides of the base substrate 12, and layer(s) 14 and/or 16 on each side may have the same coat weight. In some other of these examples, the first ink-receiving layer 14 and/or the second ink-receiving layer 16 may applied to both sides of the base substrate 12, and layer(s) 14 and/or 16 on each side may have different coat weights.

As shown in FIG. 1, the printable recording medium 10 may have an ink layer 18 disposed on the first ink-receiving layer 14 and/or the second ink-receiving layer 16. The ink layer 18 may be formed by printing a liquid ink on the outermost of the ink-receiving layer(s) 14, or 16 when present. While FIG. 1 shows the ink layer 18 on the second ink-receiving layer 16, the liquid ink may be at least partially absorbed by the first ink-receiving layer 14 and/or the second ink-receiving layer 16. Thus, the ink layer 18 may be at least partially within the first ink-receiving layer 14 and/or the second ink-receiving layer 16. Further, while the ink layer 18 is shown as covering all of the second ink-receiving layer 16, the liquid ink may be selectively printed on less than all of the first ink-receiving layer 14 and/or the second ink-receiving layer 16, and thus, the ink layer 18 may cover less than all of the first ink-receiving layer 14 and/or the second ink-receiving layer 16.

The liquid ink may include a liquid vehicle and a colorant. The ink may be any color, such as black, cyan, magenta, yellow, etc. In some examples, the ink compositions are inkjet compositions, and as such the ink compositions are well adapted to be used in an inkjet device and/or in an inkjet printing process. The liquid ink may be printed on the printable recording medium 10 by any suitable inkjet printing technique, such as thermal, acoustic, continuous or piezoelectric inkjet printing.

In some examples, the liquid ink is an aqueous inkjet ink composition, and as such the ink composition includes an aqueous liquid vehicle and a colorant. In some examples, the colorant is selected from a black colorant, a cyan colorant, a magenta colorant, and a yellow colorant. The colorant in the liquid ink may be an anionically dispersed colorant that can react with the cationic fixing agent in the first ink-receiving layer 14 and/or the second ink-receiving layer 16. The ink vehicle may include water and at least one co-solvent present in an amount ranging from about 1 wt % to about 25 wt % (based on the total weight of the liquid ink). The liquid ink may also contain at least one surfactant present in an amount ranging from about 0.1 to about 8 wt %; at least one polymer present in an amount ranging from about 0 to about 6 wt % by total weight of the ink composition. The liquid ink may further include other components common to inkjet inks, such as antimicrobial agents (e.g., biocides and fungicides), anti-kogation agents (for thermal inkjet printing), etc.

In some other examples, the liquid ink may be an anionic ink, such as an anionic pigment-based inkjet ink, an anionic pigment latex-based inkjet ink, or an anionic pigment UV curable inkjet ink.

As shown in FIG. 1, an over-print varnish layer 20 may be disposed on the ink layer 18. The over-print varnish layer 20 may protect the ink layer 18, and thus, improve the durability of the printed image (printed article 10'). The over-print varnish layer 20 may also improve the gloss of the printed article 10'.

The over-print varnish layer 20 may be formed on the ink layer 18 by applying an over-print varnish. Examples of the over-print varnish include INXKOTE® AC911 and INXKOTE® AC9116 from INX International, AQUA-FLEX® H.R. from Flint Group, and THERMAGLOSS® 1394E, THERMAGLOSS® 426, THERMAGLOSS® 425, THERMAGLOSS® 475, THERMAGLOSS® 460, and DIGIGUARD® gloss 100 from Michelman.

Figure 2:
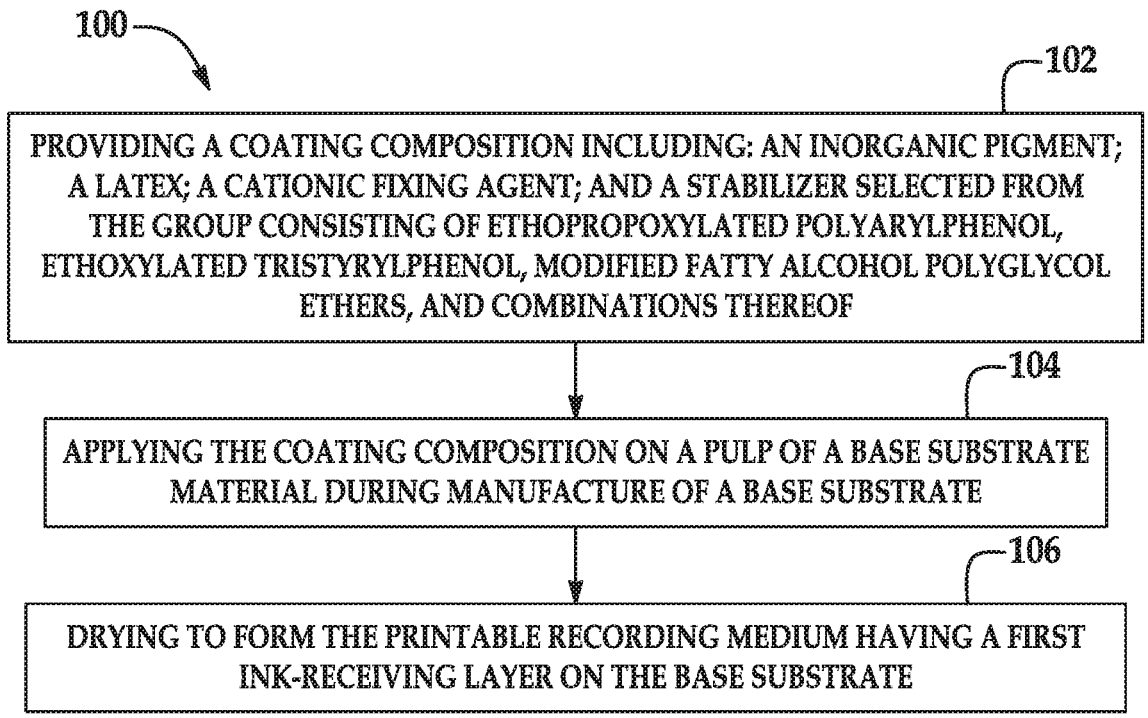
FIG. 2 is a flow diagram illustrating example(s) of a method disclosed herein.

Also disclosed herein is a method 100 for producing a printable recording medium 10. An example of the method 100 is shown in FIG. 2.

As shown at reference number 102, the method 100 comprises providing a coating composition including: an inorganic pigment; a latex; a cationic fixing agent; and a stabilizer selected from the group consisting of ethopropoxylated polyarylphenol, ethoxylated tristyrylphenol, modified fatty alcohol polyglycol ethers, and combinations thereof.

As shown at reference numeral 104, the method 100 further comprises applying the coating composition on a pulp of a base substrate material during manufacture of a base substrate 12.

The method 100 further includes drying to form the printable recording medium 10 having a first ink-receiving layer 14 on the base substrate 12, as shown in reference numeral 106. The first ink-receiving layer 14 is formed of the dried coating composition and the base substrate 12 is formed of the dried base substrate material. The coating composition, the base substrate 12, the first ink-receiving layer 14, and their components may be as described above.

In some examples, the applying of the coating composition may be accomplished within about one (1) week after the providing.

In some examples, the applying of the coating composition may include applying the coating composition on one side of the pulp of the base substrate material to form the first ink-receiving layer 14 on the one side of the base substrate 12. In other examples, the applying of the coating composition may include applying the coating composition on both sides of the pulp of the base substrate material to form the first ink-receiving layer 14 on both sides of the base substrate 12.

In some examples of the method 100, the method 100 may further include applying the coating composition on the first ink-receiving layer 14 to form a second ink-receiving layer 16. In some other examples of the method 100, the method 100 may further include providing a second coating composition and applying the second coating composition on the first ink-receiving layer 14 to form a second ink-receiving layer 16. The second coating composition, the second ink-receiving layer 16, and their components may be as described above.

In some examples of the method 100, the method 100 may further include applying a curl control layer composition to a side of the base substrate 12 opposite to the side of the base substrate 12 on which the first ink-receiving layer 14 was formed. The application and drying of the curl control layer composition forms a curl control layer. The curl control layer may be formed (by applying the curl control layer composition) before or after the first ink-receiving layer 14 is formed (by applying the coating composition). The curl control layer composition may include starch, and the curl control layer and its components may be as described above.

As mentioned above, the method 100 includes drying the coating composition and the pulp of the base substrate material. The method 100 may further include drying the second coating composition and/or curl control layer composition. In any of these examples, the drying of the coating composition and the pulp of the base substrate material, the drying of the second coating composition, and/or the drying of the curl control layer composition may be accomplished in-line. The amount of time for which the coating composition, the second coating composition, and/or the curl control layer composition is/are dried may depend, in part, on the coat speed and the base substrate material used.

In an example, the moisture content of the printable recording medium 10 after drying ranges from about 1 wt % to about 10 wt % (based on the total weight of the printable recording medium 10). In another example, the moisture content of the printable recording medium 10 after drying ranges from about 2 wt % to about 5 wt %.

In some examples of the method 100, the method 100 may further include calendering the first ink-receiving layer 14 and/or calendering the second ink-receiving layer 16. In these examples, the calendering may be accomplished by in-line calendering (hard or soft nip), or by offline super-calendering. The calendering may be accomplished at a suitable speed, temperature, pressure and number of nips to reach a desired smoothness and gloss level.

Figure 3:
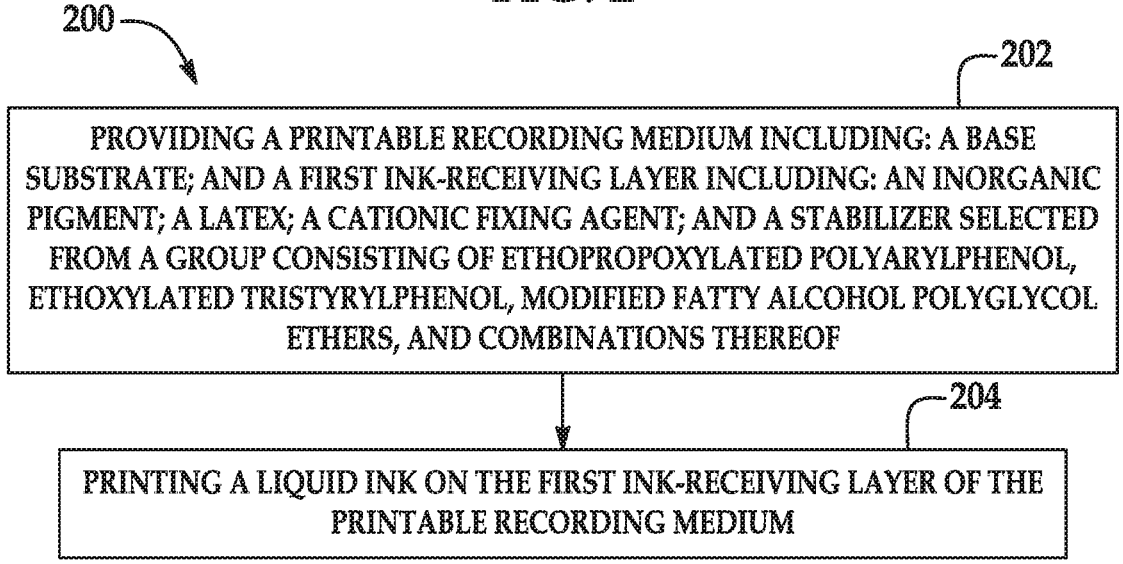
FIG. 3 is a flow diagram illustrating other example(s) of a method disclosed herein.

Also disclosed herein is a printing method 200 for producing a printed article 10'. An example of the method 200 is shown in FIG. 3.

As shown at reference number 202, the method 200 comprises providing a printable recording medium 10 including: a base substrate 12; and a first ink-receiving layer 14 including: an inorganic pigment; a latex; a cationic fixing agent; and a stabilizer selected from the group consisting of ethopropoxylated polyarylphenol, ethoxylated tristyrylphenol, modified fatty alcohol polyglycol ethers, and combinations thereof.

As shown at reference numeral 204, the method 200 further comprises printing a liquid ink on the first ink-receiving layer 14 of the printable recording medium 10.

The printable recording medium 10, the liquid ink, and their components may be as described above.

It is to be understood that printing the liquid ink on the first ink-receiving layer 14 may be accomplished by printing the liquid ink directly on the first ink-receiving layer 14 or by printing the liquid ink indirectly on the first ink-receiving layer 14 (e.g., by printing the liquid ink on the second ink-receiving layer 16, which is disposed on the first ink-receiving layer 14).

The printing of the liquid ink may be accomplished at low print speeds or at high print speeds. In an example, the printing of the liquid ink is accomplished at a low print speed of greater than 0 feet per minute (FPM) to about 100 fpm. In another example, the printing of the liquid ink is accomplished at a high print speed of at least 100 feet per minute (fpm). In another example, the liquid ink is printed on the first ink-receiving layer 14 at a high print speed ranging from 100 fpm to 600 fpm. In still another example, the liquid ink is printed on the first ink-receiving layer 14 at a high print speed ranging from 400 fpm to 600 fpm.

In an example of the printing method 200, the liquid ink may be printed on the first ink-receiving layer 14 of the printable recording medium 10 by an inkjet printing process, such as thermal, acoustic, continuous or piezoelectric inkjet printing.

In some examples of the printing method 200, after printing the liquid ink on the first ink-receiving layer 14, the method 200 may further include applying an over-print varnish onto the printed ink. The over-print varnish may be as described above.

In some examples, the liquid ink is printed, then dried in-line prior to the application of the over-print varnish. The drying of the over-print varnish may be accomplished by in-line drying the printed article 10'. The amount of time which the printed ink is dried may depend on the print speed, the color density, color profile, and the base substrate 12 used. In an example, the moisture content of the printed article 10' after drying ranges from about 1 wt % to about 10 wt % (based on the total weight of the printed article 10'). In another example, the moisture content of the printed article 10' after drying ranges from about 2 wt % to about 5 wt %.

To further illustrate the present disclosure, an example is given herein. It is to be understood that this example is provided for illustrative purposes and is not to be construed as limiting the scope of the present disclosure.

Example

An example of the coating composition (labeled E1) and three comparative example coating compositions (labeled C1, C2, and C3) were prepared. SOPROPHOR® 796/p (ethopropoxylated polyarylphenol) was included as the stabilizer in the example coating composition. DISPEX® AA 4140 NS (a solution of a sodium salt of an acrylic polymer in water, previously sold as DISPEX® N40 V, and available from BASF) was included as a dispersant in the comparative coating composition C1. SURFYNOL® CT-211 (an alkylphenylethoxylate surfactant, previously sold as CARBOWET® GA-211, and available from Evonik, previously Air Products) was included as a surfactant in the comparative coating composition C2. SURFYNOL® 440 (an ethoxylated low-foam surfactant available from Evonik, previously Air Products) was included as a surfactant in the comparative coating composition C3. The general formulations of the example and comparative coating compositions are shown in Table 1. Each number represents the dry parts of each component present in the example and comparative coating compositions.

TABLE 1

| Ingredient | Specific Component | E1 (dry parts) | C1 (dry parts) | C2 (dry parts) | C3 (dry parts) |
|---|---|---|---|---|---|
| Inorganic Pigment | HYDROCARB ® 90 (ultrafine ground calcium carbonate) | 80 | 80 | 80 | 80 |
| | KAOCAL ® (calcined Clay) | 20 | 20 | 20 | 20 |
| Stabilizer | SOPROPHOR ® 796/p | 0.3 | — | — | — |
| Dispersant | DISPEX ® AA 4140 NS | — | 0.3 | — | — |
| Surfactant | SURFYNOL ® CT-211 | — | — | 0.3 | — |
| | SURFYNOL ® 440 | — | — | — | 0.3 |
| Latex | GENCRYL ® 9780 | 10 | 10 | 10 | 10 |
| Polyvinyl Alcohol | MOWIOL ® 4-98 | 4 | 4 | 4 | 4 |
| Plastic Pigment | ROPAQUE ™ AF1055 | 2 | 2 | 2 | 2 |
| Cationic Fixing Agent | Calcium Chloride | 7 | 7 | 7 | 7 |

Each of the example and comparative coating compositions was prepared in a mixer. The dry parts were mixed with an amount of water sufficient to prepare the example and comparative coating compositions, such that each composition had a solids content ranging from about 50 wt % to about 60 wt % based on the total weight of the respective example and comparative coating compositions.

The viscosity of each of the example and comparative coating compositions was measured using a Brookfield Viscometer. The example and comparative coating compositions were each at room temperature (i.e., 25° C.) and a rotational speed of 100 rpm when the viscosity measurements were taken. The viscosity of the example coating composition E1 was 1,272 cp. The viscosity of the comparative coating composition C1 exceeded the measurement capability of the Brookfield Viscometer. The Brookfield Viscometer was able to measure viscosities up to 4,000 cp. Thus, the viscosity of the comparative coating composition C1 was greater than 4,000 cp. The viscosity of the comparative coating composition C2 was 3,234 cp, and the viscosity of the comparative coating composition C3 was 3,576 cp.

The viscosities of the comparative coating compositions were all well above 2,000 cp. Thus, the comparative coating compositions were not stable, did not have a runnable coat viscosity, and would not be able to be coated on a base substrate pulp. In contrast, the viscosity of the example coating composition was well below 2,000 cp. Thus, the example coating composition was stable, had a runnable coat viscosity, and would be able to be coated on a base substrate pulp.

Examples of the printable recording medium were prepared by blade coating the example coating composition on 42#white top uncoated liner and 36#bleached liner. The coated liners were dried until the moisture content ranges from about 3% to about 8% to form examples of the printable recording medium. Some of the example printable recording media included the second ink-receiving layer and some of the example printable recording media did not. Some of the example printable recording media that included the second ink-receiving layer included additional ink-receiving layers (i.e., some of the example printable recording media included more than two ink-receiving layers). Further, some of the example printable recording media that included the second ink-receiving layer included the cationic fixing agent in the second ink-receiving layer and some of the example printable recording media that included the second ink-receiving layer did not.

The example printable recording media were tested for durability and image quality. The results of the durability and image quality tests for the example printable recording media were acceptable.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 0.01 dry wt % to about 2 dry wt % should be interpreted to include not only the explicitly recited limits of from about 0.01 dry wt % to about 2 dry wt %, but also to include individual values, such as 0.01 dry wt %, 0.1 dry wt %, 0.5 dry wt %, 0.85 dry wt %, 1.35 dry wt %, 1.5 dry wt %, etc., and sub-ranges, such as from about 0.1 dry wt % to about 0.5 dry wt %, from about 0.25 dry wt % to about 1.28 dry wt %, from about 0.5 dry wt % to about 1.85 dry wt %, etc. Furthermore, when "about" is utilized to describe a value, this is meant to encompass minor variations (up to +/-10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A coating composition, comprising:
   an inorganic pigment having a median particle size ranging from about 0.75 µm to about 5 µm;
   a latex;
   a cationic fixing agent; and
   a stabilizer selected from the group consisting of ethopropoxylated polyarylphenol, ethoxylated tristyrylphenol, modified fatty alcohol polyglycol ethers, and combinations thereof;
   wherein:
   the inorganic pigment is present in an amount ranging from about 70 dry wt % to about 90 dry wt % based on a total dry weight of the coating composition;
   the latex is present in an amount ranging from about 5 dry wt % to about 20 dry wt % based on the total dry weight of the coating composition;
   the cationic fixing agent is present in an amount ranging from about 3 dry wt % to about 10 dry wt % based on the total dry weight of the coating composition; and the stabilizer is present in an amount ranging from about 0.01 dry wt % to about 2 dry wt % based on the total dry weight of the coating composition.

2. The coating composition as defined in claim 1, further comprising polyvinyl alcohol, a plastic pigment, water, or a combination thereof.

3. The coating composition as defined in claim 1 wherein the inorganic pigment is selected from the group consisting of calcined clay, modified calcium carbonate, ultra-fine ground calcium carbonate, precipitated calcium carbonate, and combinations thereof.

4. The coating composition as defined in claim 1 wherein the cationic fixing agent is selected from the group consisting of water-soluble mono-valent metallic salts, water-soluble multi-valent metallic salts, and combinations thereof, wherein the metallic salt includes (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, chlorohydrate, and combinations thereof.

5. The coating composition as defined in claim 1 wherein the latex is formed from a monomer selected from the group consisting of vinyl monomers, allylic monomers, olefin monomers, unsaturated hydrocarbon monomers, and combinations thereof.

6. The coating composition as defined in claim 1 wherein the coating composition is devoid of dispersants and surfactants in addition to the stabilizer.

7. The coating composition as defined in claim 1 wherein the coating composition is devoid of waxes.

8. A coating composition, consisting essentially of:
an inorganic pigment having a median particle size ranging from about 0.75 μm to about 5 μm;
a latex formed from a monomer selected from the group consisting of vinyl monomers, allylic monomers, olefin monomers, unsaturated hydrocarbon monomers, and combinations thereof and present in an amount ranging from about 5 dry wt % to about 20 dry wt % based on the total dry weight of the coating composition;
a cationic fixing agent selected from the group consisting of water-soluble mono-valent metallic salts, water-soluble multi-valent metallic salts, and combinations thereof, wherein the metallic salt includes (i) a cation of a metal selected from the group consisting of Group I metals, Group II metals, Group Ill metals, transition metals, and combinations thereof, and (ii) an anion selected from the group consisting of chloride, iodide, bromide, nitrate, sulfate, sulfite, phosphate, chlorate, acetate, chlorohydrate, and combinations thereof;
a stabilizer selected from the group consisting of ethopropoxylated polyarylphenol, ethoxylated tristyrylphenol, modified fatty alcohol polyglycol ethers, and combinations thereof; and
water;
wherein:
the inorganic pigment is present in an amount ranging from about 70 dry wt % to about 90 dry wt % based on a total dry weight of the coating composition;
the cationic fixing agent is present in an amount ranging from about 3 dry wt % to about 10 dry wt % based on the total dry weight of the coating composition; and
the stabilizer is present in an amount ranging from about 0.01 dry wt % to about 2 dry wt % based on the total dry weight of the coating composition.

9. A printable recording medium, comprising:
a base substrate; and
a first ink-receiving layer coating composition including:
an inorganic pigment having a median particle size ranging from about 0.75 μm to about 5 μm;
a latex;
a cationic fixing agent; and
a stabilizer selected from the group consisting of ethopropoxylated polyarylphenol, ethoxylated tristyrylphenol, modified fatty alcohol polyglycol ethers, and combinations thereof;
wherein:
the inorganic pigment is present in an amount ranging from about 70 dry wt % to about 90 dry wt % based on a total dry weight of the coating composition;
the latex is present in an amount ranging from about 5 dry wt % to about 20 dry wt % based on the total dry weight of the coating composition;
the cationic fixing agent is present in an amount ranging from about 3 dry wt % to about 10 dry wt % based on the total dry weight of the coating composition; and
the stabilizer is present in an amount ranging from about 0.01 dry wt % to about 2 dry wt % based on the total dry weight of the coating composition.

10. The printable recording medium as defined in claim 9, further comprising:
a second ink-receiving layer disposed on the first ink-receiving layer, the second ink-receiving layer including:
a second inorganic pigment;
a second latex;
a second cationic fixing agent; and
a second stabilizer selected from the group consisting of ethopropoxylated polyarylphenol, ethoxylated tristyrylphenol, modified fatty alcohol polyglycol ethers, and combinations thereof.

11. The printable recording medium as defined in claim 9 wherein the base substrate includes hardwood fibers, softwood fibers, recycled fibers, or a combination thereof.

12. A coating composition, consisting of:
an inorganic pigment;
a latex formed from a monomer selected from the group consisting of vinyl monomers, allylic monomers, olefin monomers, unsaturated hydrocarbon monomers, and combinations thereof and present in an amount ranging from about 5 dry wt % to about 20 dry wt % based on the total dry weight of the coating composition;
a cationic fixing agent selected from the group consisting of water-soluble mono-valent metallic salts, water-soluble multi-valent metallic salts, and combinations thereof, wherein the metallic salt includes (i) a cation of a metal selected from the group consisting of Group I metals, Group II metals, Group III metals, transition metals, and combinations thereof, and (ii) an anion selected from the group consisting of chloride, iodide, bromide, nitrate, sulfate, sulfite, phosphate, chlorate, acetate, chlorohydrate, and combinations thereof;
a stabilizer selected from the group consisting of ethopropoxylated polyarylphenol, ethoxylated tristyrylphenol, modified fatty alcohol polyglycol ethers, and combinations thereof; and
water.

* * * * *